United States Patent
Chuang et al.

(10) Patent No.: US 12,501,066 B2
(45) Date of Patent: Dec. 16, 2025

(54) VIDEO PROCESSING METHODS AND APPARATUSES FOR SUB-BLOCK MOTION COMPENSATION IN VIDEO CODING SYSTEMS

(71) Applicant: HFI Innovation Inc., Zhubei (TW)

(72) Inventors: Tzu-Der Chuang, Hsinchu (TW);
Ching-Yeh Chen, Hsinchu (TW);
Chen-Yen Lai, Hsinchu (TW);
Chih-Wei Hsu, Hsinchu (TW)

(73) Assignee: HFI INNOVATION INC.

( * ) Notice: Subject to any disclaimer, the term of this patent is extended or adjusted under 35 U.S.C. 154(b) by 0 days.

(21) Appl. No.: 18/595,935

(22) Filed: Mar. 5, 2024

(65) Prior Publication Data
US 2024/0205448 A1    Jun. 20, 2024

Related U.S. Application Data

(63) Continuation of application No. 17/545,011, filed on Dec. 8, 2021, now Pat. No. 11,956,462, which is a
(Continued)

(51) Int. Cl.
*H04N 19/52* (2014.01)
*H04N 19/105* (2014.01)
(Continued)

(52) U.S. Cl.
CPC ......... *H04N 19/513* (2014.11); *H04N 19/105* (2014.11); *H04N 19/119* (2014.11);
(Continued)

(58) Field of Classification Search
CPC .. H04N 19/513; H04N 19/105; H04N 19/119; H04N 19/159; H04N 19/176;
(Continued)

(56) References Cited

U.S. PATENT DOCUMENTS 5,841,476 A * 11/1998 Takishima .......... H04N 19/137
375/E7.22
5,990,955 A * 11/1999 Koz ..................... H04N 19/172
375/E7.181
(Continued)

FOREIGN PATENT DOCUMENTS

CN            1168062 A    12/1997
CN          102907095 A     1/2013
(Continued)

OTHER PUBLICATIONS

ITU-T H.265 Standard (Year: 2018).*
(Continued)

*Primary Examiner* — Philip P. Dang
(74) *Attorney, Agent, or Firm* — McClure, Qualey & Rodack, LLP

(57) ABSTRACT

Video processing methods for coding a current block comprise receiving input data of a current block, checking whether a sub-block motion compensation coding tool is applied to the current block based on a size, width, or height of the current block, a size, area, shape, width, or height of sub-blocks partitioned from the current block, an inter prediction direction of a sub-block Motion Vector (MV), primary MV, or one of control point MVs of the current block, a primary MV, the control point MVs, affine parameters; encoding or decoding the current block using the sub-block motion compensation coding tool or another coding tool according to a result of the checking indicating whether application of the sub-block motion compensation coding tool is valid or invalid; and a MV clipping process is applied to each sub-block in the current block if the checking result is false, indicating the validity is invalid.

7 Claims, 8 Drawing Sheets

Related U.S. Application Data continuation of application No. 17/041,655, filed as application No. PCT/CN2019/081061 on Apr. 2, 2019, now Pat. No. 11,381,834.

(60) Provisional application No. 62/665,581, filed on May 2, 2018, provisional application No. 62/655,870, filed on Apr. 11, 2018, provisional application No. 62/651,333, filed on Apr. 2, 2018.

(51) Int. Cl.
*H04N 19/119* (2014.01)
*H04N 19/159* (2014.01)
*H04N 19/176* (2014.01)
*H04N 19/513* (2014.01)
*H04N 19/533* (2014.01)

(52) U.S. Cl.
CPC ......... *H04N 19/159* (2014.11); *H04N 19/176* (2014.11); *H04N 19/533* (2014.11)

(58) Field of Classification Search
CPC ...... H04N 19/533; H04N 19/55; H04N 19/70; H04N 19/51; H04N 19/107; H04N 19/43
See application file for complete search history.

(56) References Cited

U.S. PATENT DOCUMENTS

| | | | | |
|---|---|---|---|---|
| 6,947,603 B2* | 9/2005 | Kim | | H04N 19/533 |
| | | | | 382/107 |
| 7,039,221 B1* | 5/2006 | Tumey | | G07C 9/37 |
| | | | | 382/118 |
| 8,102,920 B2* | 1/2012 | Suh | | H04N 21/235 |
| | | | | 375/240.27 |
| 8,890,971 B2* | 11/2014 | Nakashima | | H04N 23/00 |
| | | | | 348/222.1 |
| 8,891,608 B2* | 11/2014 | Lin | | H04N 19/56 |
| | | | | 375/240 |
| 9,232,118 B1* | 1/2016 | Mogre | | H04N 19/142 |
| 9,262,839 B2* | 2/2016 | Mori | | G06T 7/579 |
| 9,734,718 B2* | 8/2017 | Shida | | G08G 1/161 |
| 10,021,414 B2* | 7/2018 | Seregin | | H04N 19/52 |
| 10,034,016 B2* | 7/2018 | Yoneoka | | H04N 19/56 |
| 10,118,054 B2* | 11/2018 | Maharbiz | | A61B 6/4258 |
| 10,194,436 B2* | 1/2019 | Bharadwaj | | H04W 72/0446 |
| 10,284,853 B2* | 5/2019 | Gokhale | | H04N 19/40 |
| 10,313,692 B2* | 6/2019 | Liu | | H04N 19/167 |
| 10,448,010 B2* | 10/2019 | Chen | | H04N 19/52 |
| 10,560,712 B2* | 2/2020 | Zou | | H04N 19/567 |
| 10,631,002 B2* | 4/2020 | Li | | H04N 19/147 |
| 10,681,370 B2* | 6/2020 | Chen | | H04N 19/147 |
| 10,701,391 B2* | 6/2020 | Seregin | | H04N 19/52 |
| 10,939,096 B2* | 3/2021 | Xiu | | H04N 19/147 |
| 10,939,105 B2* | 3/2021 | Lim | | H04N 19/12 |
| 2004/0165781 A1* | 8/2004 | Sun | | G06T 7/579 |
| | | | | 382/236 |
| 2009/0135909 A1* | 5/2009 | Chen | | H04N 19/55 |
| | | | | 375/E7.123 |
| 2009/0220004 A1* | 9/2009 | Cieplinski | | H04N 19/36 |
| | | | | 375/E7.026 |
| 2013/0202047 A1* | 8/2013 | Song | | H04N 19/523 |
| | | | | 375/240.16 |
| 2013/0230099 A1* | 9/2013 | DeForest | | H04N 19/51 |
| | | | | 375/240.08 |
| 2014/0044171 A1* | 2/2014 | Takehara | | H04N 19/52 |
| | | | | 375/240.14 |
| 2014/0205013 A1* | 7/2014 | Kim | | H04N 19/139 |
| | | | | 375/240.16 |
| 2014/0321549 A1* | 10/2014 | Chen | | H04N 19/51 |
| | | | | 375/240.16 |
| 2014/0328400 A1* | 11/2014 | Puri | | H04N 19/119 |
| | | | | 375/240.16 |
| 2016/0227218 A1* | 8/2016 | Trudeau | | H04N 19/52 |
| 2016/0286232 A1* | 9/2016 | Li | | H04N 19/513 |
| 2017/0374379 A1* | 12/2017 | Chen | | H04N 19/513 |
| 2018/0108150 A1* | 4/2018 | Curtis | | G06T 7/246 |
| 2019/0273943 A1* | 9/2019 | Zhao | | H04N 19/139 |
| 2020/0158517 A1* | 5/2020 | Tadi | | G06T 7/248 |

FOREIGN PATENT DOCUMENTS

| | | |
|---|---|---|
| CN | 104885458 A | 9/2015 |
| EP | 3 651 465 A1 | 5/2020 |
| WO | 2017/157249 A1 | 9/2017 |

OTHER PUBLICATIONS

International Search Report and Written Opinion mailed Jun. 27, 2019, issued in application No. PCT/CN2019/081061.
Chinese language office action dated Feb. 14, 2020, issued in application No. TW 108111649.
Extended European Search Report dated Dec. 17, 2021, issued in application No. EP 19781522.8.
Chen, J., et al.; "Algorithm description of Joint Exploration Test Model 7 (JEM7);" Joint Video Exploration Team (JVET) of ITU-T SG 16 WP 3 and ISO/IEC JTC 1/SC 29/WG 11; Jul. 2017; pp. 1-48.
Zhou, M.; "CE2-related: A restriction on memory bandwidth consumption of affine mode;" Joint Video Experts Team (JVET) of ITU-T SG 16 WP 3 and ISO/IEC JTC 1/SC 29/WG 11; Dec. 2018; pp. 1-7.

* cited by examiner

8x8 Current CU

VIDEO PROCESSING METHODS AND APPARATUSES FOR SUB-BLOCK MOTION COMPENSATION IN VIDEO CODING SYSTEMS

CROSS REFERENCE TO RELATED APPLICATIONS

The present invention is Continuation of pending U.S. patent application Ser. No. 17/545,011, filed on Dec. 8, 2021, which is a Continuation of Ser. No. 17/041,655, filed on Sep. 25, 2020, which is a 371 National Phase Application of PCT Patent Application No. PCT/CN2019/081061, filed on Apr. 2, 2019, which claims priority to U.S. Provisional Patent Application, Ser. No. 62/651,333, filed on Apr. 2, 2018, entitled "Method of Sub-block Motion Vector Refinement", U.S. Provisional Patent Application, Serial No. US62/655,870, filed on Apr. 11, 2018, entitled "Improvement of Adaptive Motion Vector Difference Resolution", and U.S. Provisional Patent Application, Serial No. US62/665,581, filed on May 2, 2018, entitled "Method of Motion Vector Constraint for Sub-block Motion Compensation". The U.S. Provisional Patent Applications are hereby incorporated by reference in their entireties.

FIELD OF THE INVENTION

The present invention relates to video processing methods and apparatuses in video encoding and decoding systems. In particular, the present invention relates to adaptively determining sub-block size for sub-block motion compensation.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard improves the video compression performance of its preceding standard H.264/AVC to meet the demand for higher picture resolutions, higher frame rates, and better video qualities. The HEVC standard relies on a block-based coding structure which divides each video slice into multiple square Coding Tree Units (CTUs), where a CTU is the basic unit for video compression in HEVC. A raster scan order is used to encode or decode CTUs in each slice. Each CTU may contain one Coding Unit (CU) or recursively split into four smaller CUs according to a quad-tree partitioning structure until a predefined minimum CU size is reached. The prediction decision is made at the CU level, where each CU is coded using either inter picture prediction or intra picture prediction. Once the splitting of CU hierarchical tree is done, each CU is subject to further split into one or more Prediction Units (PUs) according to a PU partition type for prediction. The PU works as a basic representative block for sharing prediction information as the same prediction process is applied to all pixels in the PU. The prediction information is conveyed to the decoder on a PU basis. Motion estimation in inter picture prediction identifies one (uni-prediction) or two (bi-prediction) best reference blocks for a current block in one or two reference pictures, and motion compensation in inter picture prediction locates the one or two best reference blocks according to one or two Motion Vectors (MVs). A difference between the current block and a corresponding predictor is called prediction residual. The corresponding predictor is the best reference block when uni-prediction is used. When bi-prediction is used, the two reference blocks are combined to form the predictor.

Skip and Merge Skip and Merge modes were proposed and adopted in the HEVC standard to increase the coding efficiency of MV by inheriting motion information from one of spatially neighboring blocks or a temporal collocated block. To code a PU in Skip or Merge mode, instead of signaling motion information, only an index representing a final candidate selected from a candidate set is signaled. The motion information reused by the PU coded in Skip or Merge mode includes a MV, an inter prediction indicator, and a reference picture index of the selected final candidate. It is noted that if the selected final candidate is a temporal motion candidate, the reference picture index is always set to zero. Prediction residuals are coded when the PU is coded in Merge mode, however, the Skip mode further skips signaling of the prediction residual as the residual data of a PU coded in Skip mode is forced to be zero.

A Merge candidate set consists of four spatial motion candidates and one temporal motion candidate. As shown in FIG. 1, the first Merge candidate is a left predictor $A_1$ 112, the second Merge candidate is a top predictor $B_1$ 114, the third Merge candidate is a right above predictor $B_0$ 113, and a fourth Merge candidate is a left below predictor $A_0$ 111. A left above predictor $B_2$ 115 is included in the Merge candidate set to replace an unavailable spatial predictor. A fifth Merge candidate is a first available temporal predictor selected from $T_{BR}$ 121 and $T_{CTR}$ 122. The encoder selects one final candidate from the candidate set for each PU coded in Skip or Merge mode based on motion vector compensation such as through a Rate-Distortion Optimization (RDO) decision, and an index representing the selected final candidate is signaled to the decoder. The decoder selects the same final candidate from the candidate set according to the index transmitted in the video bitstream. Since the derivations of Skip and Merge candidates are similar, the "Merge" mode referred hereafter may correspond to Merge mode as well as Skip mode for convenience.

Subblock TMVP A Subblock Temporal Motion Vector Prediction (Subblock TMVP, SbTMVP) mode is applied to the Merge mode by including at least one SbTMVP candidate as a Merge candidate in the candidate set. SbTMVP is also referred to as Alternative Temporal Motion Vector Prediction (ATMVP). A current PU is partitioned into smaller sub-PUs, and corresponding temporal collocated motion vectors of the sub-PUs are searched. An example of the SbTMVP technique is illustrated in FIG. 2, where a current PU 21 of size M×N is divided into (M/P)×(N/Q) sub-PUs, each sub-PU is of size P×Q, where M is divisible by P and N is divisible by Q. The detailed algorithm of the SbTMVP mode may be described in three steps as follows.

In step 1, an initial motion vector is assigned to the current PU 21, denoted as vec_init. The initial motion vector is typically the first available candidate among spatial neighboring blocks. For example, List X is the first list for searching collocated information, and vec_init is set to List X MV of the first available spatial neighboring block, where X is 0 or 1. The value of X (0 or 1) depends on which list is better for inheriting motion information, for example, List 0 is the first list for searching when the Picture Order Count (POC) distance between the reference picture and current picture in List 0 is closer than the POC distance in List 1. List X assignment may be performed at slice level or picture level. After obtaining the initial motion vector, a "collocated picture searching process" begins to find a main collocated picture, denoted as main_colpic, for all sub-PUs in the current PU. The reference picture selected by the first available spatial neighboring block is first searched, after that, all reference pictures of the current picture are searched sequentially. For B-slices, after searching the reference picture selected by the first available spatial neighboring block, the search starts from a first list (List 0 or List 1) reference index 0, then index 1, then index 2, until the last reference picture in the first list, when the reference pictures in the first list are all searched, the reference pictures in a second list are searched one after another. For P-slice, the reference picture selected by the first available spatial neighboring block is first searched; followed by all reference pictures in the list starting from reference index 0, then index 1, then index 2, and so on. During the collocated picture searching process, "availability checking" checks the collocated sub-PU around the center position of the current PU pointed by vec_init_scaled is coded by an inter picture prediction mode or intra picture prediction mode for each searched picture. Vec_init_scaled is the MV with appropriated MV scaling from vec_init. Some embodiments of determining "around the center position" are a center pixel (M/2, N/2) in a PU size M×N, a center pixel in a center sub-PU, or a mix of the center pixel or the center pixel in the center sub-PU depending on the shape of the current PU. The availability checking result is true when the collocated sub-PU around the center position pointed by vec_init_scaled is coded by an inter picture prediction mode. The current searched picture is recorded as the main collocated picture main_colpic and the collocated picture searching process finishes when the availability checking result for the current searched picture is true. The MV of the around center position is used and scaled to derive a default MV for the current block if the availability checking result is true. If the availability checking result is false, that is when the collocated sub-PU around the center position pointed by vec_init_scaled is coded by an intra picture prediction mode, it goes to search a next reference picture. MV scaling is needed during the collocated picture searching process when the reference picture of vec_init is not equal to the original reference picture. The MV is scaled depending on temporal distances between the current picture and the reference picture of vec_init and the searched reference picture, respectively. After MV scaling, the scaled MV is denoted as vec_init_scaled.

In step 2, a collocated location in main_colpic is located for each sub-PU. For example, corresponding location 221 and location 222 for sub-PU 211 and sub-PU 212 in FIG. 2 are first located in the temporal collocated picture 22 (main_colpic). The collocated location for a current sub-PU i is calculated in the following:

collocated location $x =$

Sub-PU_i_x + vec_init_scaled_i_x(integer part) + shift_x, collocated location $y =$ Sub-PU_i_y + vec_init_scaled_i_y(integer part) + shift_y, where Sub-PU_i_x represents a horizontal left-top location of sub-PU i inside the current picture, Sub-PU_i_y represents a vertical left-top location of sub-PU i inside the current picture, vec_init_scaled_i_x represents a horizontal component of the scaled initial motion vector for sub-PU i (vec_init_scaled_i), vec_init_scaled_i_y represents a vertical component of vec_init_scaled_i, and shift x and shifty represent a horizontal shift value and a vertical shift value respectively. To reduce the computational complexity, only integer locations of Sub-PU_i_x and Sub-PU_i_y, and integer parts of vec_init_scaled_i_x, and vec_init_scaled_i_y are used in the calculation. In FIG. 2, the collocated location 225 is pointed by vec_init_sub_0 223 from location 221 for sub-PU 211 and the collocated location 226 is pointed by vec_init_sub_1 224 from location 222 for sub-PU 212.

In step 3 of SbTMVP, Motion Information (MI) for each sub-PU, denoted as SubPU_MI_i, is obtained from collocated_picture_i_L0 and collocated_picture_i_L1 on collocated location x and collocated location y. MI is defined as a set of {MV_x, MV_y, reference lists, reference index, and other merge-mode-sensitive information, such as a local illumination compensation flag}. Moreover, MV_x and MV_y may be scaled according to the temporal distance relation between a collocated picture, current picture, and reference picture of the collocated MV. If MI is not available for some sub_PU, MI of a sub_PU around the center position will be used, or more generally, a default MV will be used. As shown in FIG. 2, subPU0_MV 227 obtained from the collocated location 225 and subPU1_MV 228 obtained from the collocated location 226 are used to derive predictors for sub-PU 211 and sub-PU 212 respectively. Each sub-PU in the current PU 21 derives its own predictor according to the MI obtained on the corresponding collocated location.

STMVP In JEM-3.0, a Spatial-Temporal Motion Vector Prediction (STMVP) is used to derive a new candidate to be included in a candidate set for Merge mode. Motion vectors of sub-blocks are derived recursively following a raster scan order using temporal and spatial motion vector predictors. FIG. 3 illustrates an example of one CU with four sub-blocks and its neighboring blocks for deriving a STMVP candidate. The CU in FIG. 3 is 8×8 containing four 4×4 sub-blocks, A, B, C and D, and neighboring N×N blocks in the current picture are labeled as a, b, c, and d. The STMVP candidate derivation for sub-block A starts by identifying its two spatial neighboring blocks. The first neighboring block c is a N×N block above sub-block A, and the second neighboring block b is a N×N block to the left of the sub-block A. Other N×N block above sub-block A, from left to right, starting at block c, are checked if block c is unavailable or block c is intra coded. Other N×N block to the left of sub-block A, from top to bottom, starting at block b, are checked if block b is unavailable or block b is intra coded. Motion information obtained from the two neighboring blocks for each list are scaled to a first reference picture for a given list. A Temporal Motion Vector Predictor (TMVP) of sub-block A is then derived by following the same procedure of TMVP derivation as specified in the HEVC standard. For example, motion information of a collocated block at location D is fetched and scaled accordingly. Finally, all available motion vectors for a current sub-block are averaged separately for each reference list. The averaged motion vector is assigned as the motion vector for the current sub-block.

PMVD A Pattern-based MV Derivation (PMVD) method, also referred as FRUC (Frame Rate Up Conversion) or DMVR (Decoder-side MV Refinement), consists of bilateral matching for bi-prediction block and template matching for a uni-prediction block. A FRUC_mrg_flag is signaled when Merge or Skip flag is true, and if FRUC_mrg_flag is true, a FRUC_merge_mode is signaled to indicate whether the bilateral matching Merge mode as shown in FIG. 4 or template matching Merge mode as shown in FIG. 5 is selected. Both bilateral matching Merge mode and template matching Merge mode consist of two-stage matching: the first stage is PU-level matching, and the second stage is sub-PU-level matching. In the PU-level matching, multiple initial MVs in LIST_0 and LIST_1 are selected respectively. These MVs includes MVs from Merge candidates (i.e., conventional Merge candidates such as these specified in the HEVC standard) and MVs from temporal derived MVPs. Two different starting MV sets are generated for two lists. For each MV in one list, a MV pair is generated by composing of this MV and the mirrored MV that is derived by scaling the MV to the other list. For each MV pair, two reference blocks are compensated by using this MV pair. The Sum of Absolute Differences (SAD) of these two blocks is calculated. The MV pair with the smallest SAD is selected as the best MV pair. Then a diamond search is performed to refine the MV pair. The refinement precision is ⅛-pel. The refinement search range is restricted within ±8 pixels. The final MV pair is the PU-level derived MV pair.

The sub-PU-level searching in the second stage searches a best MV pair for each sub-PU. The current PU is divided into sub-PUs, where the depth of sub-PU is signaled in Sequence Parameter Set (SPS) with a minimum sub-PU size of 4×4. Several starting MVs in List 0 and List 1 are selected for each sub-PU, which includes PU-level derived MV pair, zero MV, HEVC collocated TMVP of the current sub-PU and bottom-right block, temporal derived MVP of the current sub-PU, and MVs of left and above PUs or sub-PUs. By using the similar mechanism in PU-level searching, the best MV pair for each sub-PU is selected. Then the diamond search is performed to refine the best MV pair. Motion compensation for each sub-PU is then performed to generate a predictor for each sub-PU.

For bilateral matching merge mode as shown in FIG. 4, motion information for a current block 410 in a current picture is derived based on two reference pictures Ref 0 and Ref 1. Bilateral matching is applied when the motion vector derived from Merge mode is bi-prediction pointing to two reference pictures with an equal distance from the current picture (i.e. temporal distances TD0=TD1). The motion information of the current block 410 is derived by searching the best match between two blocks 420 and 430 along the motion trajectory 440 of the current block in two different reference pictures Ref 0 and Ref 1. Under the assumption of continuous motion trajectory, the motion vectors MV0 associated with Ref 0 and MV1 associated with Ref 1 pointing to the two reference blocks shall be proportional to the temporal distances TD0 and TD1, between the current picture and the two reference pictures Ref 0 and Ref 1.

FIG. 5 illustrates an example of template matching Merge mode. The reconstructed pixels of above four rows and left four columns of a current block are used to form a template, for example, the two neighboring areas 520a and 520b of the current block 510 in a current picture are used as the template. Template matching is performed to find the best matched template with its corresponding MV, for example, the best matched template 530a and 530b in a reference picture Ref 0 are found with its corresponding motion vector 540. In the PU-level matching of the two-stage matching, several starting MVs in List 0 and List 1 such as MVs from Merge candidates and MVs from temporal derived MVPs are selected. Two different starting MV sets are generated for two lists. For each MV in one list, the SAD cost of the template with the MV is calculated. The MV with the smallest SAD cost is the best MV The diamond search is performed to refine the best MV with a refinement precision of ⅛-pel, and restricted the refinement search range to be within ±8 pixels. The final MV is the PU-level derived MV. The MVs in List 0 and List 1 are generated independently. For the sub-PU-level searching, the current PU is divided into sub-PUs. For each sub-PU at left or top PU boundaries, several starting MVs in List 0 and List 1 are selected, and by using similar mechanism in PU-level searching, the best MV pair for each sub-PU at left or top PU boundaries is selected. The diamond search is performed to refine the MV pair. Motion compensation is performed to generate a predictor for each sub-PU according to the refine MV pair. For those PUs which are not at left or top PU boundaries, the sub-PU-level searching is not applied, and the corresponding MVs are set to the MVs in the first stage. While the List 0 reference picture (Ref 0) is shown in FIG. 5, the List 1 reference picture (Ref 1) can also be used as a reference picture for template matching search.

Affine MCP Affine Motion Compensation Prediction (Affine MCP) is a technique developed for predicting various types of motion other than the translation motion. For example, affine MCP more accurately predicts rotation, zoom in, zoom out, perspective motions and other irregular motions. An exemplary simplified 4-parameter affine MCP as shown in FIG. 6A is applied in JEM-3.0 to improve the coding efficiency. A 4-parameter affine motion field of a block is described by motion vectors 613 and 614 of two control points 611 and 612. The two MVs 613 and 614 are referred as control point MVs. The 4-parameter Affine Motion Vector Field (MVF) of a block is described by the following equations:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases}$$

where $(v_{0x}, v_{0y})$ represents the motion vector 613 of the top-left corner control point 611, $(v_{1x}, v_{1y})$ represents the motion vector 614 of the top-right corner control point 612, and w represents the block width. An exemplary simplified 6-parameter affine MCP as shown in FIG. 6C. A 6-parameter affine motion field of a block is described by motion vectors 634, 635, and 636 of three control points 631, 632, and 633. The three MVs 634, 635, and 636 are referred as control point MVs. The 6-parameter Affine Motion Vector Field (MVF) of a block is described by the following equations:

$$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases}$$

where $(v_{0x}, v_{0y})$ represents the motion vector 634 of the top-left corner control point 631, $(v_{1x}, v_{1y})$ represents the motion vector 635 of the top-right corner control point 632, $(v_{2x}, v_{2y})$ represents the motion vector 636 of the bottom-left corner control point 633, w represents the block width, and h represents the block height. A general affine motion model can be defined by the following equations:

$$\begin{cases} v_x = ax + cy + e \\ v_y = bx + dy + f \end{cases}$$

A block based affine motion compensation prediction is applied instead of pixel based affine motion compensation prediction in order to further simplify the calculation. FIG. 6B illustrates partitioning a block into sub-blocks and affine MCP is applied to each sub-block. As shown in FIG. 6B, a motion vector of a center sample of each 4×4 sub-block is calculated according to the above equation, and then rounded to 1/16 fraction accuracy. Motion compensation interpolation is applied to generate a predictor for each sub-block according to the derived motion vector. After performing motion compensation prediction, the high accuracy motion vector of each sub-block is rounded and stored with the same accuracy as a normal motion vector.

Sub-block motion compensation is applied in many recently developed coding tools such as SbTMVP, STMVP, PMVD, and Affine MCP. A CU or a PU is divided into multiple sub-blocks, and these sub-blocks may have different reference pictures and different MVs. A high bandwidth is demanded for sub-block motion compensation especially when MVs of each sub-block are very diverse.

During the motion compensation process performed by a video encoder or video decoder, one or more reference blocks have to be retrieved for each block according to motion information. Since fractional-pixel motion vectors are supported in newer coding standards such as HEVC, additional reference pixels around the reference block have to be retrieved as well for interpolation calculations. The number of rows or columns required for interpolation at fractional-pixel locations is the same for all block sizes. Therefore, the ratio of bandwidth increasing for smaller block sizes is higher than for larger block sizes. When a sub-block motion compensation coding tool is used, motion vectors associated with the sub-blocks may be different and reference pixels of the sub-blocks pointed by the sub-block MVs may spread out. This will further increase the required system bandwidth. It is thus desired to develop methods to reduce the required bandwidth and computational complexity for sub-block motion compensation.

BRIEF SUMMARY OF THE INVENTION

In exemplary embodiments of the video processing method for sub-block motion compensation, a video coding system receives input video data associated with a current block in a current picture, partitions the current block into multiple sub-blocks, derives sub-block MVs associated with the sub-blocks in the current block according to the sub-block motion compensation tool, constrains the sub-block MVs to form constrained sub-block MVs by restricting a difference between a primary MV and each sub-block MV within one or more thresholds, and applies motion compensation to the current block using the constrained sub-block MVs to encode or decode the current block. The thresholds are adaptively determined depending on a size, width, or height of the current block or a sub-block, an inter prediction direction of a control point MV, the current block, or current sub-block, one or more control point MVs of the current block, or a combination thereof. In one embodiment, a constrained sub-block MV is selected from a sub-block MV within the range in a second list if a corresponding sub-block MV in a first list is outside the range. The first and second lists correspond to List 0 and List 1 or List 1 and List 0 respectively. Each sub-block MV is restricted to the range from (primary MV− Threshold) to (primary MV+ Threshold) according to an embodiment, where Threshold corresponds to one threshold value, and if one sub-block MV is outside the range, the sub-block MV is clipped to the range.

The threshold may be adaptively determined for each block coded by the sub-block motion compensation tool, or the threshold may be adaptively determined for each sub-block. In one exemplary embodiment, the threshold is adaptively determined to be zero or unlimited. All the sub-block MVs are clipped to the primary MV if the threshold is zero, and constraining the sub-block MVs is not applied to the current block if the threshold is unlimited. The threshold depends on a diversity of the control point MVs according to an embodiment. The diversity of the control point MVs is derived according to the control point MVs, the inter prediction direction of the control point MVs, and the width and height of the current block. The threshold is zero if the diversity of the control point MVs is relatively diverse or the threshold is unlimited if the diversity of the control point MVs is less diverse. The primary MV in some embodiments is one of the control point MVs of the current block, one of the sub-block MVs in the current block, a center MV of the current block, a derived MV using a center position sample of the current block, or a derived MV. The video processing method for coding blocks by a sub-block motion compensation coding tool with adaptive threshold may be implemented in both video encoding and decoding systems or only in the video encoding system. When the video processing method is only applied in the video encoding system, information related to the constrained sub-block MVs are signaled in a video bitstream. The encoding or decoding system derives the primary MV and loads required reference data around the primary MV for motion compensation.

In a variation of the video processing method for sub-block motion compensation, the method comprises receiving input video data associated with a current block in a current picture, partitioning the current block into multiple sub-blocks, deriving a primary reference block, deriving sub-block MVs associated with the sub-blocks according to a sub-block motion compensation coding tool, and applying motion compensation to the current block using one or more reference pixels of reference sub-blocks within the primary reference block and excluding any reference pixel of reference sub-blocks outside the primary reference block. The reference sub-blocks are pointed by the derived sub-block MVs. A size or shape of the primary reference block is adaptively determined according to a size, area, shape, width, or height of the sub-blocks in the current block or the sub-block, an inter prediction direction of a sub-block MV, primary MV, or one of control point MVs of the current block, the control point MVs of the current block, or a combination thereof. The size or shape of the primary reference block may be normalized by the size, area, shape, width, or height of the current block. When the sub-block motion compensation tool is affine motion compensation prediction, the size or shape of the primary reference block or the normalized primary reference block may be adaptively determined according to control point MVs or affine parameters of the current block. In some embodiments, the primary reference block covers a reference block pointed by the primary MV. Any reference pixel of reference sub-blocks outside the primary reference block is replaced by a pseudo reference pixel or the affine model is set as not available, and examples of the pseudo reference pixel include a predefined pixel value or a padding pixel of the primary reference block, and an example of setting the affine model as not available include setting all the sub-block MVs as the same value. In an embodiment, interpolation filter coefficients are modified to exclude any reference pixel of reference sub-blocks outside the primary reference block. The sub-block motion compensation coding tool is not applied and the sub-block MVs are all set to the same value if any reference pixel of reference sub-blocks is outside the primary reference block according to another embodiment.

In some exemplary embodiments, the size or the shape of the primary reference block or the normalized primary reference block is adaptively determined according to control point MVs or affine parameters of the current block when the sub-block motion compensation coding tool is affine MCP. The size or the shape of the primary reference block or the normalized primary reference block may be derived according to a MV difference between the control point MVs and the width and height of the current block, and the size or shape is compared with a predefined value. The affine MCP is not applied to the current block if the size or the shape of the primary reference block or the normalized primary reference block is larger than the predefined value. In an embodiment, the predefined value is selected depending on the inter prediction direction.

Some embodiments of the video processing method in a video coding system receive input video data associated with a current block, check whether a sub-block motion compensation coding tool is applied to the current block, and encode or decode the current block using the sub-block motion compensation coding tool or another coding tool according to the checking result. The validity of applying the sub-block motion compensation coding tool may be decided according to a width or height of the current block, a size, area, shape, width, or height of sub-blocks partitioned from the current block, an inter prediction direction of a control point MV of the current block, a sub-block MV, or primary MV, motion information such as a primary MV or the control point MVs, affine parameters, or a combination of the above. In an embodiment, a MV clipping process is applied to each sub-block in the current block if the checking result is false, indicating the validity is invalid.

Some other embodiments of video processing methods implemented in a video coding system for encoding or decoding blocks using a sub-block motion compensation coding tool comprise receiving input video data of a current block in a current picture, determining a sub-block size for splitting the current block, partitioning the current block into multiple sub-blocks according to the sub-block size, deriving sub-block Motion Vectors (MVs) for the sub-blocks according to the sub-block motion compensation coding tool, and applying motion compensation to the current block using the sub-block MVs. The sub-block size may be adaptively determined, that is the sub-block size for partitioning the current block may be different from a sub-block size for partitioning another block coded by the same sub-block motion compensation coding tool. The sub-block motion compensation coding tool is selected from SbTMVP, STMVP, affine motion compensation prediction, and sub-block refined PMVD mode. The sub-block size for partitioning the current block may be implicitly determined by both encoders and decoders or the encoders explicitly signal information related to the sub-block size in a video bitstream.

In an embodiment of adaptively determining the sub-block size, the sub-block size is determined according to a derived MV of the current block or a derived sub-block MV, for example, a first sub-block size is used to divide the current block if the derived MV or the derived sub-block MV is bi-prediction or multi-hypothesis prediction, and a second sub-block size is used to divide the current block if the derived MV or the derived sub-block MV is uni-prediction. In this embodiment, the first sub-block size is set to be larger than the second sub-block size. In another example, the sub-block size is restricted to be larger than or equal to a minimum sub-block size if the derived MV or sub-block MV is bi-predicted or multi-hypothesis predicted. In yet another example, a first minimum sub-block size for bi-predicted or multi-hypothesis predicted sub-blocks is set to be larger than a second minimum sub-block size for uni-predicted sub-blocks.

Some embodiments of the video coding system determine or restrict the sub-block size for the current block according to control point MVs when the current block is coded in affine motion compensation prediction. For example, the diversity of the control point MVs is used to determine the sub-block size. The diversity may be measured by a MV difference between the control point MVs and the width and height of the current block. In one example, a large sub-block size is selected when the control point MV difference is relatively large while a small sub-block size is selected when the control point MV difference is relatively small.

Aspects of the disclosure further provide an apparatus for video processing in a video coding system encoding or decoding blocks by a sub-block motion compensation coding tool. The apparatus comprises one or more electronic circuits configured for receiving input video data of a current block in a current picture, partitioning the current block into multiple sub-blocks, deriving sub-block MVs associated with the sub-blocks in the current block according to a sub-block motion compensation coding tool, constraining sub-block MVs to form constrained sub-block MVs by restricting a difference between a primary MV and each sub-block MV within one or more thresholds, and applying motion compensation to the current block using the constrained sub-block MVs to encode or decode the current block. The thresholds are adaptively determined depending on a size, width, or height of the current block or a sub-block, an inter prediction direction of a control point MV of the current block, the current block, or current sub-block, motion information such as the control point MVs, or a combination thereof.

Aspects of the disclosure further provide a non-transitory computer readable medium storing program instructions for causing a processing circuit of an apparatus to perform a video processing method to encode or decode a current block by a sub-block motion compensation coding tool. Input video data associated with a current block in a current picture is received, the current block is partitioned into multiple sub-blocks, and sub-block MVs associated with the sub-block are derived according to a sub-block motion compensation coding tool. The sub-block MVs are constrained according to a size, width, or height of the current block or a sub-block, an inter prediction direction, control point MVs, or a combination of the above. The current block is encoded or decoded by applying motion compensation using the constrained sub-block MVs.

Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein.

DETAILED DESCRIPTION OF THE INVENTION

Figure 1:
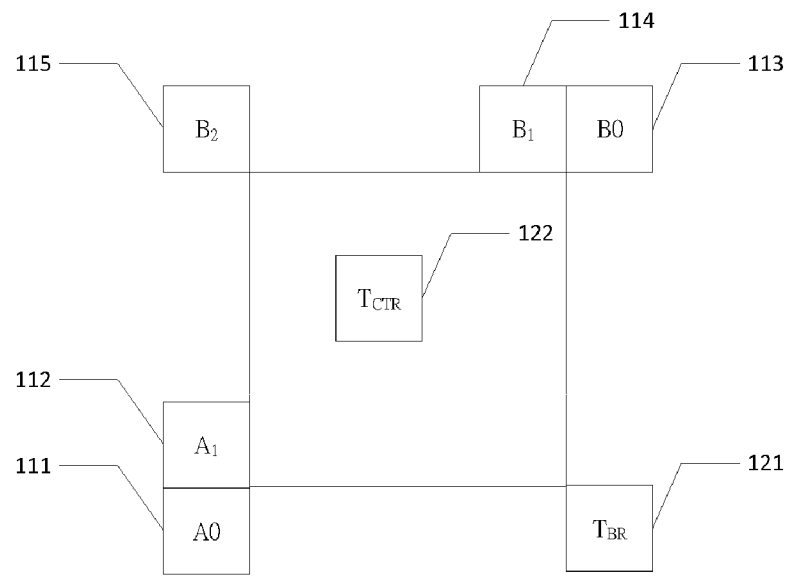
FIG. 1 illustrates locations of spatial predictors and temporal predictors for constructing a candidate set for Skip or Merge mode defined in the HEVC standard.
Figure 2:
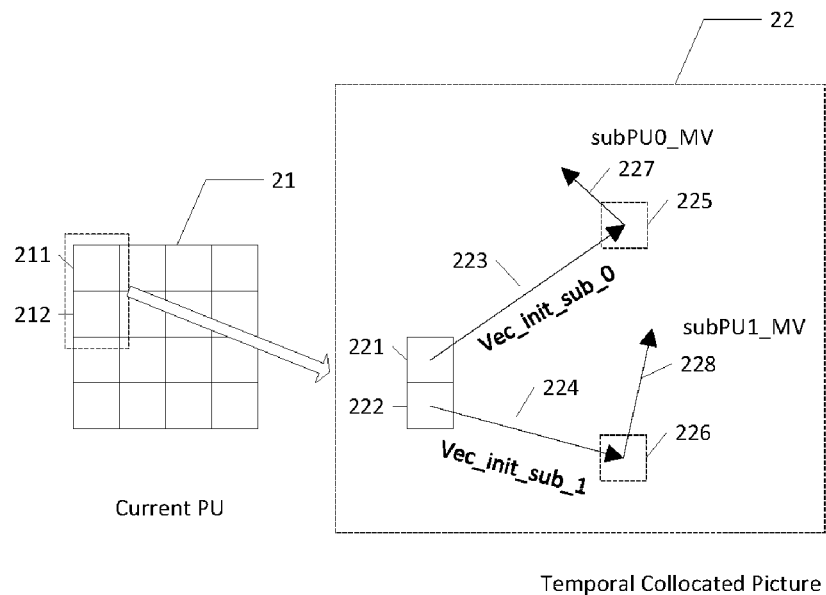
FIG. 2 illustrates an example of determining motion vectors for sub-blocks in a current PU according to the SbTMVP technique.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

In the HEVC standard, in order to reduce the bandwidth requirement for inter prediction, 4×4 inter block is forbidden and the smallest inter blocks 8×4 and 4×8 are restricted to be uni-prediction only. Since bi-prediction is not allowed for blocks with sizes equal to 4×8 or 8×4, the worse case in terms of bandwidth happens in processing 8×8 bi-predicted blocks. The worse case bandwidth per pixel for motion compensating a 8×8 bi-predicted block with a L-tap interpolation filter is calculated by $(8+L-1)(8+L-1)*2/64$, in an example of 8-tap interpolation filter, the worse case bandwidth per pixel is $(8+7)(8+7)*2/64=7.03$. However, several sub-block motion compensation coding tools are proposed in the next generation video coding standard, if sub-blocks with sizes less than 8×8 are coded by bi-prediction, the worse case bandwidth requirement for these sub-block motion compensation coding tools will exceed that of in the HEVC standard. For example, the smallest size of an affine coded sub-block is 4×4, and the worse case bandwidth per pixel for motion compensating a 4×4 bi-predicted block with the 8-tap interpolation filter is $(4+7)(4+7)*2/16=15.13$, which is more than twice the worse case bandwidth per pixel in HEVC. The bandwidth requirement for processing 4×4 sub-blocks in SbTMVP, STMVP, affine motion compensation prediction, or sub-block refined PMVD mode is even larger than the bandwidth required for motion compensating a 4×4 bi-prediction block. Embodiments of the present invention provide various new methods to reduce the bandwidth requirement or system complexity for sub-block motion compensation. The present invention may be applied to one or more sub-block motion compensation coding tools such as Subblock Temporal Motion Vector Prediction (SbTMVP), Spatial Temporal Motion Vector Prediction (STMVP), affine motion compensation prediction, and sub-block refined Pattern based Motion Vector Derivation (PMVD) mode.

Adaptive Sub-block Size A sub-block size for partitioning a current block may be adaptively determined when the current block is coded using a sub-block motion compensation coding tool. The current block is a current Coding Unit (CU) or a current Prediction Unit (PU). In some embodiments, the sub-block size is determined according to a derived MV of the current block or a sub-block MV. For example, a larger sub-block size is assigned to a current block to be coded in sub-block motion compensation if the current block is coded in bi-prediction or multi-hypothesis prediction. A smaller sub-block size is assigned to a current block if the prediction direction is uni-prediction. The sub-block size may be implicitly derived by both the encoder and decoder, or the sub-block size is determined by the encoder and information related to the sub-block size is explicitly signaled in a video bitstream to the decoder. In one embodiment, a sub-block size for a current block to be coded in sub-block motion compensation is restricted by a minimum sub-block size, as the sub-block size of the current block has to be larger than or equal to the minimum sub-block size. The minimum sub-block size for each block may be adaptively determined, for example, a minimum sub-block size for bi-predicted or multi-hypothesis predicted sub-blocks is set to be larger than a minimum sub-block size for uni-predicted sub-blocks. In another example, only sub-block sizes for bi-predicted or multi-hypothesis predicted sub-blocks are restricted by a minimum sub-block size, whereas sub-block sizes for uni-predicted sub-blocks are not restricted. The minimum sub-block sizes may be implicitly derived for each block by the encoder and decoder, or information related to the minimum sub-block sizes may be explicitly signaled in a video bitstream by the encoder.

Some embodiments of adaptive sub-block size in affine motion compensation prediction determine a sub-block size of a current block according to control point MVs of the current block. For example, the video coding system first checks whether the control point MVs of the current block are diverse. The reference blocks pointed by the control point MVs or the sub-block MVs derived from the control point MVs are relatively near when the control point MVs are less diverse. In an example of checking whether the control point MVs are diverse, one or more MV difference between the control point MVs and the current block width and/or height are calculated and compared with one or more thresholds, and these control point MVs are considered to be less diverse if the one or more MV differences are less than the one or more thresholds, otherwise the control point MVs are diverse as the corresponding reference blocks are relatively far away from each other. The threshold can be selected depend on whether the current block is a uni-predicted block, bi-predicted block, or multi-hypothesis predicted block. The MV differences and the thresholds may be calculated and compared by separating the horizontal and vertical components. In another example of checking whether the control point MVs are diverse, one or more variables are calculated from the information includes the MV difference between the control point MVs and the current block width and/or height, and these control point MVs are considered to be less diverse if the one or more variables are less than the one or more threshold, otherwise the control point MVs are diverse as the corresponding reference blocks are relatively far away from each other, where the threshold can depend on whether the current block is a uni-predicted block, bi-predicted block, or multi-hypothesis predicted block. For less diverse control point MVs, reference blocks pointed by sub-block MVs are usually near or even overlapped, so a relatively small reference block range is loaded for processing the current block. A relatively large reference block range is required for a current block with diverse control point MVs as reference blocks pointed by sub-block MVs are usually far away from each other. In one embodiment, a large sub-block size is thus selected for blocks with diverse control point MVs while a small sub-block size is selected for blocks otherwise. In another embodiment, the sub-block size of a current block coded in affine motion compensation prediction may be restricted by a minimum sub-block size, where the minimum sub-block size is derived according to control point MVs of the current block. For example, a minimum sub-block size is set for blocks with diverse control point MVs. In another example, a first minimum sub-block size for blocks with large control point MV differences is set to be larger than a second minimum sub-block size for blocks with small control point MV differences. The sub-block size or the minimum sub-block size for each block may be implicitly derived by both the encoder and decoder, or information related to the sub-block size may be explicitly signaled in the video bitstream by the encoder.

In some other embodiments of adaptive sub-block size, a sub-block size is determined by a distance between a current picture and a reference picture. The sub-block size may be adaptively selected for each block coded in a sub-block motion compensation coding tool according to its reference picture. An example of measuring the distance between two pictures is by subtracting a Picture Order Count (POC) of the reference picture from a POC of the current picture. A POC difference or so called a delta POC is then compared with a threshold, and a small sub-block size may be used for a block with a smaller delta POC while a large sub-block size may be used for a block with a larger delta POC. In another embodiment, a large sub-block size is chosen for a block with a delta POC less than or equal to the threshold while a small sub-block size is chosen for a block with a delta POC greater than the threshold. The sub-block size may be implicitly derived by both the encoder and decoder, or the sub-block size is determined by the encoder and explicitly signaled in the video bitstream to the decoder. Alternatively, the sub-block size of a current block may be restricted according to a delta POC between a current picture and a reference picture. For example, the sub-block size for a block with a large delta POC is restricted by a first minimum sub-block size, and the sub-block size for a block with a small delta POC is restricted by a second minimum sub-block size. The first and second minimum sub-block sizes are different, and are either implicitly determined by both the encoder and decoder or explicitly signaled to the decoder. In another example, a minimum sub-block size is only used to restrict the blocks with a large delta POC or the blocks with a small delta POC.

Another embodiment of adaptive sub-block size determines or restricts a sub-block size according to a MV difference between MVs in List 0 and List 1. For example, a List 1 MV is first scaled to the List 0 reference picture, and a Motion Vector Difference (MVD) is calculated between the scaled List 1 MV and the List 0 MV. The MVD is then compared to a threshold. In one example, a large sub-block size is selected for a block with a large MVD while a small sub-block size is selected for a block with a small MVD. In another example, a large sub-block size is selected for a block with a small MVD while a small sub-block size is selected for a block with a large MVD. A minimum sub-block size may be set to restrict the sub-block size if the MVD between the two MVs of the current block is larger than a threshold. Alternatively, a first minimum sub-block size is used for restricting the sub-block size of a block with a large MVD while a second minimum sub-block size is used for restricting the sub-block size of a block with a small MVD. The first and second minimum sub-block sizes are different. The sub-block size or the minimum sub-block size may be implicitly derived by both the encoder and decoder or explicitly signaled to the decoder.

In yet another embodiment, a sub-block size of a current block is determined or restricted according to a width, height, size, area, or shape of the current block. For example, a large sub-block size is selected for a current block if a width or height is greater than a predefined value, and a small sub-block size is selected if the width or height is less than or equal to the predefined value. In another example, a sub-block size for a current block is restricted to be smaller than a minimum sub-block size if a size of the current block is smaller than a threshold. Alternatively, two or more minimum sub-block sizes are set to restrict the sub-block sizes for different sizes of current block. The sub-block size or the minimum sub-block size may be implicitly derived by both the encoder and decoder or explicitly signaled to the decoder.

Figure 7:
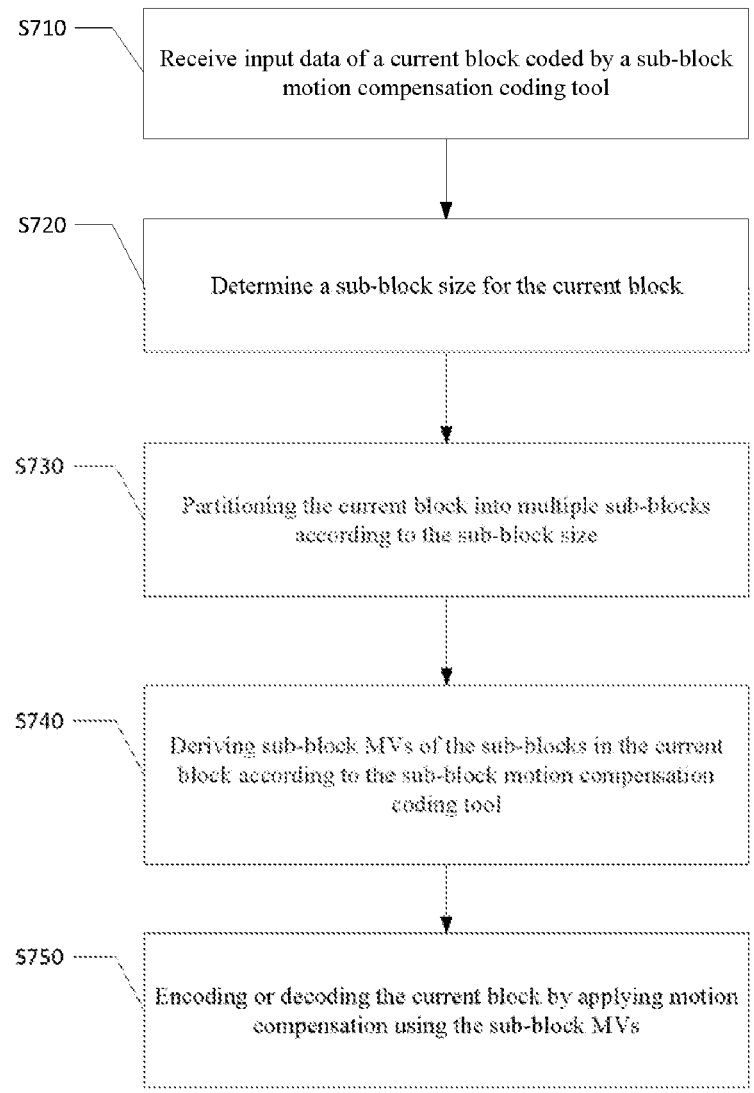
FIG. 7 is a flowchart showing an example of adaptive sub-block size for partitioning a current block into multiple sub-blocks according to an embodiment of the present invention.

Exemplary Flowchart for Adaptive Sub-block Size FIG. 7 illustrates an exemplary flowchart of a video encoding or decoding system for processing a block to be encoded or decoded by a sub-block motion compensation coding tool according to an embodiment of the present invention. The video encoding or decoding system receives input data associated with a current block coded by a sub-block motion compensation coding tool in a current picture in Step S710. Some examples of the sub-block motion compensation coding tool are SbTMVP, STMVP, affine motion compensation prediction, and sub-block refined PMVD mode. At the encoder side, the input data corresponds to pixel data to be encoded; at the decoder side, the input data corresponds to coded data or prediction residual to be decoded. In Step S720, a sub-block size is adaptively determined for partitioning the current block. Two blocks coded by the same sub-block motion compensation coding tool may have different sub-block sizes. In some embodiments, the sub-block size is determined according to a derived MV of the current block, a derived sub-block MV, a prediction direction, control point MVs, a distance between the current picture and a reference picture, a MVD between List 0 MV and List 1 MV, or a size, width, or height of the current block. In some other embodiments, the sub-block size is restricted by a minimum sub-block size, and the minimum sub-block size is related to a derived MV of the current block, a derived sub-block MV, a prediction direction, control point MVs, a distance between the current picture and a reference picture, a MVD between List 0 MV and List 1 MV, or a size, width, or height of the current block. The video encoding or decoding system partitions the current block into multiple sub-blocks according to the determined sub-block size in Step S730. The sub-block motion compensation coding tool derives sub-block MVs for the sub-blocks in the current block in Step S740. In Step 750, the video encoding or decoding system encodes or decodes the current block by applying motion compensation to the current block using the sub-block MVs.

Figure 8:
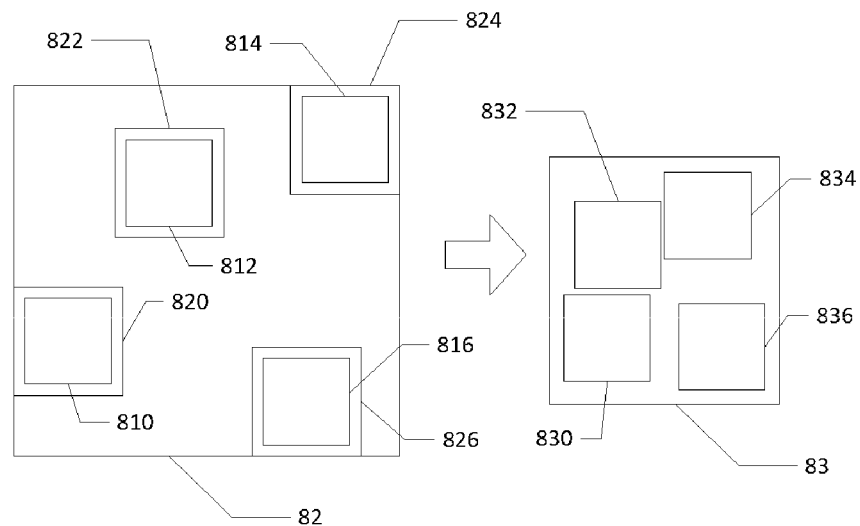
FIG. 8 illustrates a concept of MV constraint which reduces the bandwidth for loading reference sub-blocks by limiting sub-block MVs around a primary MV according to an embodiment of the present invention.

Adaptive threshold for MV constraint. In some embodiments of the present invention, a Motion Vector (MV) constraint is applied to restrict a difference between a primary MV and each sub-block MV in a current block to be within one or more thresholds. A restriction range may be defined by setting a range around the primary MV. For example, a primary MV in a reference list is first derived and then a threshold is adaptively determined according to one or more of an inter prediction direction of control point MVs of the current block, the current block or current sub-block, the control point MVs of the current block, and a size, width, or height of the current block or the current sub-block. All sub-block MVs in the reference list are restricted within the restriction range of primary MV±Threshold (i.e., from primary MV− Threshold to primary MV+ Threshold or from primary MV− Threshold1 to primary MV+ Threshold2), where Threshold, Threshold1, and Threshold2 correspond to one threshold value. In one example, the threshold is 0 or un-limited, when the threshold is 0, all sub-block MVs in the current block are clipped to the primary MV, and when the threshold is un-limited, all sub-block MVs in the current block remain unchanged. Some examples of the primary MV include one of the control point MVs, one of the sub-block MVs in the current block, a center MV of the current block, or a derived MV. The center MV of the current block may be derived by the affine equations using the center pixel of the current block. In some embodiments, a sub-block MV is clipped within the restriction range or is replaced by a default MV if the sub-block MV is outside of the restriction range. An example of the default MV is the primary MV. For example, the primary MV is one of the control point MVs or one of the sub-block MVs. In another example, for affine motion compensation prediction, the primary MV is one of the control point MVs, one of the sub-block MVs in the current block, the center MV of the current block, the derived MV using a center position sample of the current block, or a derived MV. In another example, if MV of one of List 0 or List 1 is outside of the restriction range while the MV of the other list is inside the restriction range, only the MV of the other list is used. The MV of the list that is outside of the restriction range is modified as non-valid. FIG. 8 illustrates a concept of applying a MV constraint which limits sub-block MVs around a primary MV to restrict all reference sub-blocks pointed by the sub-block MVs within a range. Conventionally, a decoder loads individual blocks 820, 822, 824, and 826 containing original reference sub-blocks 810, 812, 814, and 816 pointed by original sub-block MVs for motion compensating the sub-blocks, or the decoder loads a large block 82 including all the blocks 820, 822, 824, and 826. After limiting the sub-block MVs within a restriction range defined by the threshold, the decoder only needs to load a block 83 containing reference sub-blocks 830, 832, 834, and 836 pointed by the constrained sub-block MVs once for these sub-blocks.

The threshold for defining the restriction range is an adaptive value determined by a size of the current block, width or height of the current block, a size, area, shape, width, or height of a sub-block in the current block, control point MVs of the current block, an inter prediction direction of a current block, a current sub-block, the primary MV, or the control point MVs of the current block, or a combination of the above. The threshold may be set to unlimited, which means the sub-block MV constraint is not applied to the current block. In one example, the threshold depends on a diversity of control point MVs, and the diversity of the control point MVs is derived according to the control point MVs, an inter prediction direction of the control point MVs, and the width and height of the current block. One or more variables are calculated from the information including the MV difference(s) between the control point MVs and the width and height of the current block. The one or more variables are then compared to a predefined value to check for the degree of diversity. These control point MVs are considered to be less diverse if the one or more variables are less than the predefined value, otherwise the control point MVs are relatively diverse as the corresponding reference sub-blocks of the sub-blocks in the current block are relatively far away from each other. The predefined value for evaluating these variables may be selected depending on whether the current block is a uni-predicted block, bi-predicted block or multi-hypothesis predicted block. For example, a larger predefined value is selected if the current block is a uni-predicted block while a smaller predefined value is selected if the current block is a bi-predicted block or multi-hypothesis predicted block. In another example, a smaller predefined value is selected if the current block is a uni-predicted block while a larger predefined value is selected if the current block is a bi-predicted block or multi-hypothesis predicted block. The variables for comparing the one or more thresholds when the current block is a uni-predicted block can be different from the variables for comparing the one or more thresholds when the current block is a bi-predicted block or multi-hypothesis predicted block. In one embodiment, if the control point MVs are considered to be less diverse, the threshold for defining the restriction range is set to un-limited. Otherwise, if the control point MVs are considered to be more diverse, the threshold for defining the restriction range is set to 0.

In some embodiments, the threshold is related to a sub-block size and/or an inter prediction direction. For example, the threshold for restricting a sub-block MV is set to a large value or is set to un-limited when the sub-block MV is a uni-predicted MV; and the threshold is set to a small value when the sub-block MV is a bi-predicted MV In another example, the threshold for restricting all sub-block MVs associated with a current block is set to a large value or is set to un-limited when a primary MV of the current block is a uni-predicted MV. A small threshold value is assigned for restricting the sub-block MVs when the primary MV is a bi-predicted MV. The threshold may be adaptively determined according to one or a combination of a size, width, height, or shape of the sub-blocks in the current block. In one embodiment, if the sub-block size is smaller than a predefined size, for example, 8×8, a small threshold is applied for restricting the sub-block MVs. In this embodiment, the threshold may be different according to the sub-block size, for example, a first threshold is selected for larger sub-block sizes while a second threshold is selected for smaller sub-block sizes, where the first threshold is larger than the second threshold. An example of the larger sub-block sizes include sizes larger than or equal to 8×8 (i.e. 8×8, 16×8, 8×16) and the smaller sub-block sizes include sizes smaller than 8×8 (i.e. 4×8, 8×4, 4×4). Different thresholds or MV restriction ranges can be set for different sub-blocks. In another example, a larger threshold is applied when a sub-block width or height is greater than a predefined value and is predicted by uni-prediction, and a smaller threshold is applied for sub-blocks with a smaller sub-block width or height or for sub-blocks predicted by bi-prediction.

Multiple thresholds may be used to define the MV restriction range in various sub-block motion compensation coding tools. For example, one threshold is for a horizontal component of the MV and another threshold is for a vertical component of the MV. The horizontal component of the MV may be determined according to the size or width of the current block, and the vertical component of the MV may be determined according to the size or height of the current block. In some embodiments, the threshold for the vertical or horizontal MV may be different for positive direction and negative direction. For example, the horizontal component MVs of a current block are limited within the range of (primary_MVx− $thresholdX_1$, primary_MVx+$thresholdX_2$). The two thresholds $thresholdX_1$ and $thresholdX_2$ can be set depending on the size of the current block, the width and/or height of the current block, or the primary MV.

For SbTMVP, the primary MV may be the default MV, the initial MV (i.e. vec_init), scaled initial MV (i.e. vec_init_scaled), one of sub-block MVs in the current block, or a derived MV. Some examples of the sub-block MVs that could be used as the primary MV are MVs of corner sub-blocks and MVs of center sub-blocks. Some examples of the derived MV are the MV derived using a center pixel or a center block of the current block, or the MV derived using the sub-PU around the center position.

Figure 3:
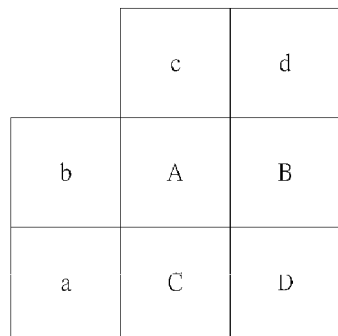
FIG. 3 illustrates an example of determining a Merge candidate according to the STMVP technique.
Figure 4:
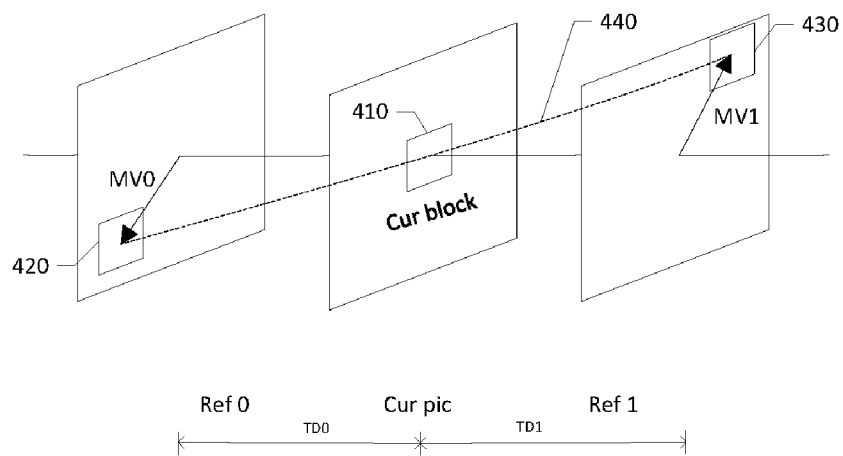
FIG. 4 illustrates an example of applying bilateral matching for a current block in a current picture to search for reference blocks in two equal-distance reference pictures.
Figure 5:
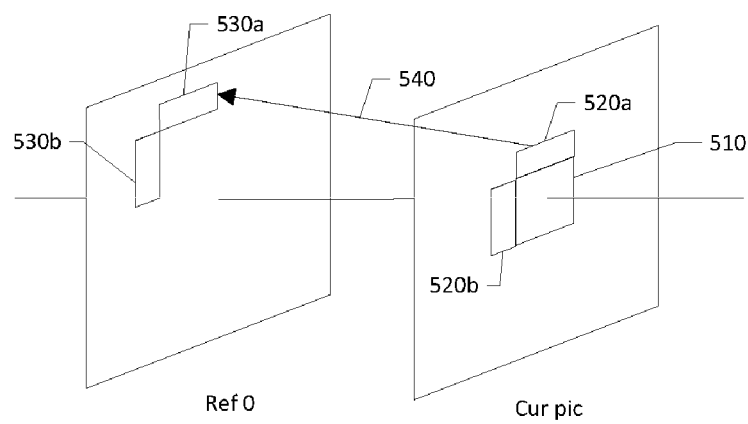
FIG. 5 illustrates an example of applying template matching for a current block in a current picture to search for a MV pointing to a reference block with best matched templates.
Figures 6A, 6B:
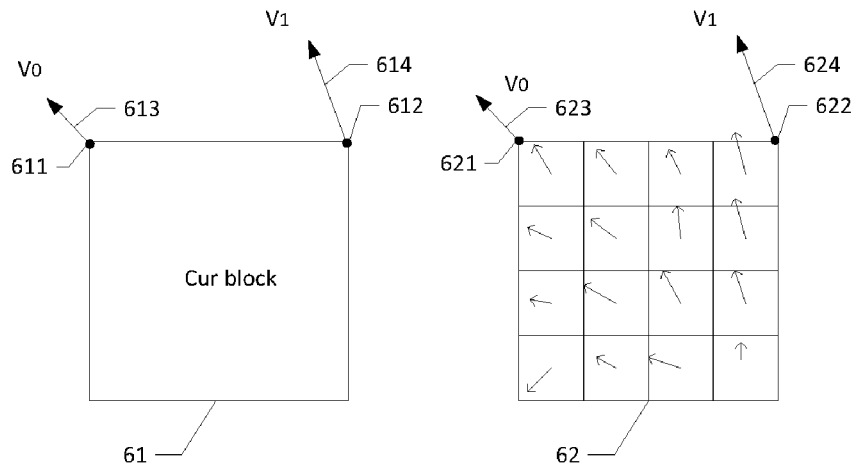
FIG. 6A illustrates an example of applying affine motion compensation prediction on a current block with two control points.
FIG. 6B illustrates an example of applying block based affine motion compensation prediction with two control points.
Figure 6C:
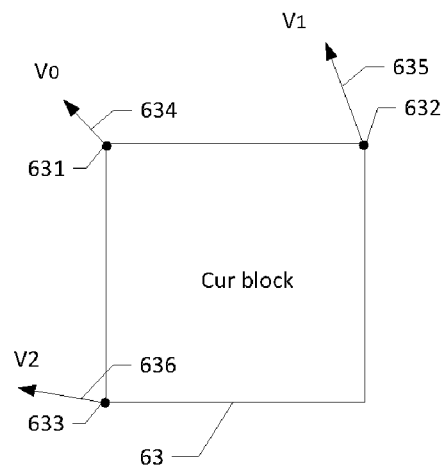
FIG. 6C illustrates an example of applying affine motion compensation prediction on a current block with three control points.

For STMVP, the primary MV may be the first derived sub-block MV, such as the MV of sub-block A in FIG. 3, a MV of a neighboring block, a temporal collocated MV, or a derived MV. In one example, the derived MV is the MV derived by using a center pixel or a center sub-block of the current block.

For affine motion compensation prediction, the primary MV may be one of the control point MVs, one of the sub-block MVs in the current block, a center MV of the current block derived by a center pixel or a center sub-block of the current block, or a derived MV. Some examples of the sub-block MVs used as the primary MV are the MVs of corner sub-blocks and MVs of center sub-blocks. An example of the derived MV used as the primary MV is the MV derived using a center pixel or a center block of the current block. In one embodiment, if MVs of control points for a current block coded in affine motion compensation prediction are located outside the restriction range, the MVs of the control points are clipped within the restriction range or replaced by the primary MV After MV clipping or replacement, MVs of sub-blocks in the current block are derived using the new control point MVs.

For sub-block refined PMVD Merge mode, the primary MV may be the PU initial MV or the CU/PU refined MV The sub-block refined MVs are limited around the primary MV.

In one embodiment, the MV threshold can be different for different sub-blocks. For example, the horizontal MV of sub-block 1 is limited within the range of (primary_MVx− thresholdX1, primary_MVx+thresholdX2), and the horizontal MV of sub-block 2 is limited within the range of (primary_MVx−thresholdX3, primary_MVx+thresholdX4). The threshold value thresholdX1 may be different from thresholdX3, and the threshold value thresholdX2 may be different from thresholdX4. For example, if the location of sub-block 1 is left to the location of sub-block 2, thresholdX1 can be smaller than thresholdX3.

The proposed MV constraint method can be applied normatively or can be applied as an encoder-side constraint. If it's normative, MVs of all sub-block are generated with the rule as described above, that is, all the MVs will be within the restriction range around the primary MV For encoder constraint, it is a requirement of bitstream conformance that the MVs of all sub-blocks shall follow the rule as described before. All the MVs of the sub-blocks shall be within the restriction range around the primary MV If not, this mode or this Merge candidate shall not be selected in the encoder side.

In the decoder side, when a current block is coded in a sub-block motion compensation mode, a primary MV is first derived. The decoder can load the reference data around the primary MV For example, a reference block with the size of (thresholdX1+blockWidth+interpolationFilterTapLength−1+thresholdX2)*(thresholdX1+blockHeight+interpolationFilterTapLength−1+thresholdX2) can be loaded for motion compensation of all sub-blocks in the current block.

Reference Block Constraint In some embodiments, whether a MV of each sub-block is inside or outside the restriction range is determined according to a reference block range, where the reference block range is determined according to a MV or any other MV related information. If a reference block pointed by a sub-block MV is covered by a primary reference block, the sub-block MV is considered as inside the restriction range. For example, a primary reference block that covers the block pointed by a primary MV is used for motion compensation of all sub-blocks. In sub-block motion compensation, if all required reference pixels of a sub-block pointed by the sub-block MV are within the primary reference block, original reference pixels in the primary reference block are used. If any required reference pixel is not within the primary reference block, a pseudo reference pixel is used. The pseudo reference pixel may have a predefined pixel value such as 128, 512, or (1<<(bit_depth−1)) or may be a padding pixel of the primary reference block. In another example, if any required reference pixel is not within the primary reference block, the sub-block mode is an unavailable mode for a current block. The size or shape of the primary reference block may be adaptively determined depending on a size or shape of the current block, width or height of the current block, size, area, shape, width, or height of the sub-block, an inter prediction direction of the sub-block MV, one of control point MVs of the current block, or the primary MV, the control point MVs of the current block, or a combination of the above. For example, the size or the shape of a primary reference block for uni-predicted CU or sub-blocks is larger than the size or the shape of a primary reference block for bi-predicted or multiple predicted CU or sub-blocks. In one embodiment, the size or shape of a primary reference block is determined according to a sub-block MV or primary MV of the current block. When the current block is coded by affine motion compensation prediction, a sub-block MV is derived from control point MVs of the current block, so the size or shape of the primary reference block may be determined based on the control point MVs of the current block. Since affine parameters are derived by the control point MVs, the size or shape of the primary reference block may be determined based on the affine parameters of the current block. In one example, the primary reference block size or the shape for a current block depends on a diversity of control point MVs, and the diversity of the control point MVs is derived according to the control point MVs, an inter prediction direction of the control point MVs, and the width and height of the current block. More than one variables are calculated from the information includes the MV difference(s) between the control point MVs and the width and height of the current block. The multiplied result of the two of the variables represents the size or the shape of the primary reference block. The derived primary reference block size or shape can be normalized by the width or height of the current block. The primary reference block size or shape or the normalized primary reference block size or shape is compared with a predefined value to check for a degree of diversity. The control point MVs are considered to be less diverse if the size or shape of the primary reference block or the normalized primary reference block size or shape is less than the predefined value, otherwise the control point MVs are relatively diverse as the corresponding reference sub-blocks are relatively far away from each other. The predefined value for evaluating the primary reference block size or shape or normalized primary reference block size or shape may be selected depending on whether the current block is a uni-predicted block, bi-predicted block, or multi-hypothesis predicted block. For example, a larger predefined value is selected if the current block is uni-predicted block while a smaller predefined value is selected if the current block is bi-predicted block. For another example, a smaller predefined value is selected if the current block is uni-predicted block while a larger predefined value is selected if the current block is bi-predicted block. In one embodiment, if the primary reference block size or the normalized primary reference block size is larger than the predefined value, the sub-block mode is an unavailable mode for the current block, for example, the affine MCP is not applied to the current block. The sub-block MVs are thus set to the same value and a translational motion model is applied for this current block.

Figure 9:
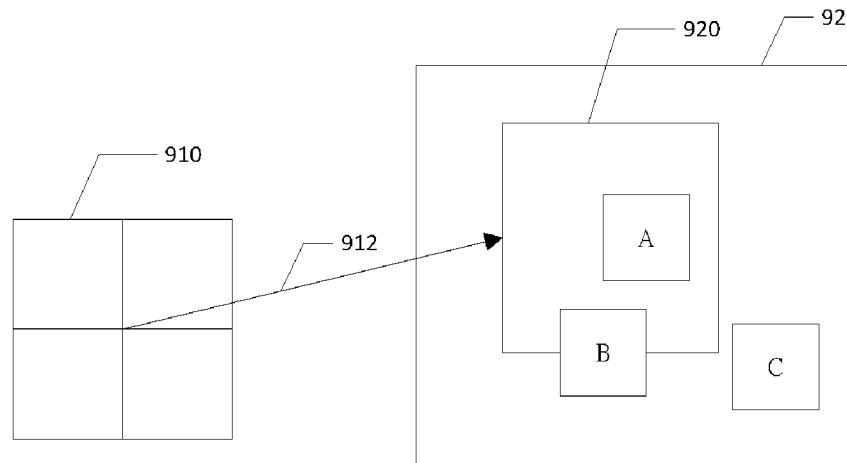
FIG. 9 illustrates an example of reference block constraint which restricts motion compensation of all sub-blocks within a primary reference block according to an embodiment of the present invention.

FIG. 9 shows an example of applying reference block constraint in a current block coded by a sub-block motion compensation coding tool. A primary MV 912 is first derived for an 8×8 CU 910. A primary reference block 920 pointed by the primary MV 912 in a reference picture 92 is used for the motion compensation of sub-blocks in the 8×8 CU 910. If all reference pixels of a sub-block are within the primary reference block 920 (e.g. block A, all the reference pixels of which are within the primary reference block 920), original pixels in the reference block are used. If the reference pixels of a sub-block are not within the primary reference block 920 (e.g. block C, reference pixels of which are not within the primary reference block 920), padded pixels according to the primary reference block 920 are used. If part of the reference pixels of a sub-block are within the primary reference block and part of the reference pixels are not (e.g. block B, which has part of the reference pixels within the primary reference block 920 and has part of the reference pixels not within the primary reference block 920), part of original pixels in the primary reference block 920 and part of padded pixels are used. In another embodiment, the interpolation filter coefficients are modified to exclude any reference pixel of reference sub-blocks outside the primary reference block. In another example, if a part of the reference pixels of a sub-block is not within the primary reference block, the sub-block mode is an unavailable mode for the current block, for example, the sub-block MVs are all set to the same value when the sub-block mode is set to an unavailable mode.

The proposed reference block constraint method can be applied normatively or can be applied as an encoder-side constraint. If it's normative, reference pixels of all sub-block are generated with the rule as described above, that is, pixels of reference sub-blocks within the primary reference block is used while pixels outside the primary reference block are not used. In another example of normative implementation of the reference block constraint method, if a part of the reference pixels of a sub-block is not within the primary reference block, the sub-block mode is an unavailable mode for the current block, for example, the sub-block MVs are all set to the same value if the affine mode is used. For encoder constraint, it is a requirement of bitstream conformance that the reference pixels of all sub-blocks shall follow the rule as described before. The encoder encodes the current block using reference pixels of reference sub-blocks within the primary reference block by a sub-block motion compensation coding tool. If any reference sub-block pointed by a sub-block MV is not within the primary reference block, this sub-block motion compensation coding tool is not selected in the encoder side. For example, if the sub-block motion compensation coding tool is affine motion compensation prediction, the affine motion compensation prediction technique is not applied to blocks with one or more reference sub-blocks outside the corresponding primary reference block. In another example, if the sub-block motion compensation coding tool is SbTMVP or STMVP, the associated candidate generated by SbTMVP or STMVP is not selected if any reference sub-block of the current block is outside the corresponding primary reference block.

Check for Validity of Sub-block Motion Compensation Coding Tool As mentioned in some of the previous paragraphs, some embodiments implement the MV constraint or reference block constraint to restrict sub-block MVs or restrict reference pixels. Instead of clipping or replacing the sub-block MVs or replacing reference pixels of reference sub-blocks, a video encoding or decoding system may decide not to process the current block using the sub-block motion compensation coding tool if a sub-block MV is outside a MV restriction range or a reference sub-block is outside a primary reference block. In one example, a video encoder or decoder checks the validity of applying a sub-block motion compensation coding tool to a current block according to a width or height of the current block, a size, area, shape, width, or height of sub-blocks partitioned from the current block, an inter prediction direction of a sub-block MV, one or more control point MVs, or a primary MV, control point MVs, affine parameters, or a combination of the above. The sub-block motion compensation coding tool can only be used to encode or decode the current block if the checking result shows the sub-block motion compensation coding tool is valid, otherwise the current block is encoded using another coding tool. In one embodiment, a MV clipping process is applied to each sub-block in the current block when the checking result shows the sub-block motion compensation coding tool is invalid. For examples, all the sub-block MVs in the current block are clipped to the same value.

In one embodiment, a width or height of a current block, a size, area, shape, width, or height of sub-blocks, an inter prediction direction of a sub-block MV, a primary MV, or control point MVs, the control point MVs, affine parameters, or a combination of the above, can be used to judge whether one or more sub-block MVs of the current block are outside a MV restriction range. If one or more sub-block MVs are outside the MV restriction range, the mode (e.g. affine motion compensation prediction or sub-block refined PMVD mode) or the Merge candidate (e.g. affine candidate, SbTMVP candidate, or STMVP candidate) associated with the sub-block motion compensation coding tool is not selected by the encoder to encode the current block. The encoder encodes the current block using another coding tool.

Sub-block Candidate for PMVD An embodiment of the present invention reduces the requirement bandwidth for PMVD process as well as improving the coding efficiency by signaling a starting MV candidate. The second stage of PMVD, which is the PU-level matching, first determines multiple starting MVs such as the MVs from Merge candidates and MVs from temporal derived MVPs, then generates a MV pair from each starting MV for derivation of two reference blocks. The SAD of these two reference blocks is calculated and the MV pair with the smallest SAD is selected. A diamond search is performed to refine the selected MV pair. After PU-level matching, sub-PU-level matching is performed. In this embodiment, the video decoder only needs to parse the starting MV and refine the MV pair derived from the parsed starting MV The entire process of evaluating all the starting MVs in PU-level matching is therefore avoided. The bandwidth requirement can be reduced significantly. In one embodiment, to reduce the searching complexity in PU-level matching, sub-block MV candidates such as affine candidate, ATMVP, and STMVP candidates, are not included in a candidate list. In another embodiment, the sub-block MV candidates are included in the candidate list. If a non-sub-block MV candidate is selected, the original two-stage process including PU-level matching and sub-PU-level matching is applied. If a sub-block MV candidate is selected, PU-level matching is skipped, only sub-PU-level matching is performed. In an embodiment, for a sub-block MV candidate, one MV candidate is derived for each sub-block in a current block if the sub-block MV candidate is selected for the current block. In sub-PU-level matching, the decoder only refines the signaled MV of each sub-block. To further reduce the bandwidth requirement, MV constraint or reference block constraint mentioned above may also be applied. The primary MV may be set as the MV of one of the sub-block in the current CU, for example, the MV of a top-left sub-block, or the MV of a center sub-block of the current CU.

Figure 10:
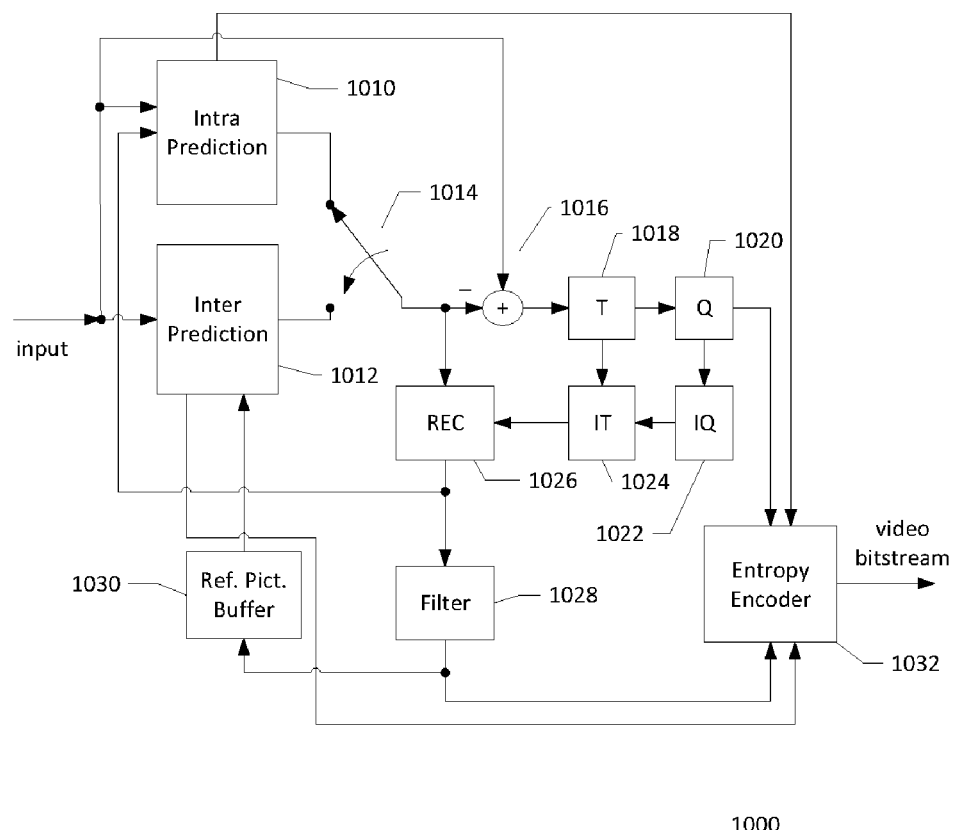
FIG. 10 illustrates an exemplary system block diagram for a video encoding system incorporating the video processing method according to embodiments of the present invention.

Video Encoder and Decoder Implementations The foregoing proposed video processing methods for sub-block motion compensation can be implemented in video encoders or decoders. For example, a proposed video processing method is implemented in an inter prediction module of an encoder, and/or an inter prediction module of a decoder. In another example, a proposed video processing method is implemented in a sub-block partitioning module or a MV derivation module of an encoder, and/or a sub-block partitioning module or a MV derivation module of a decoder. Alternatively, any of the proposed methods is implemented as a circuit coupled to the inter prediction module, sub-block partitioning module, or MV derivation module of the encoder and/or the inter prediction module, sub-block partitioning module, or MV derivation module of the decoder, so as to provide the information needed by the inter prediction module, sub-block partitioning module, or MV derivation module. FIG. 10 illustrates an exemplary system block diagram for a Video Encoder 1000 implementing various embodiments of the present invention. Intra Prediction 1010 provides intra predictors based on reconstructed video data of a current picture. Inter Prediction 1012 performs motion estimation (ME) and motion compensation (MC) to provide inter predictors based on video data from other picture or pictures. To encode a current block by a sub-block motion compensation coding tool according to some embodiments of the present invention, a threshold for defining a MV restriction range, a sub-block size, or a size or shape of a primary reference block is adaptively determined. The threshold, sub-block size, or a size or shape of the primary reference block may be determined or restricted by a size, height, or width of the current block or a sub-block, an inter prediction direction, control point MVs of the current block, or a combination of the above. The current block is then partitioned into multiple sub-blocks, and sub-block MVs are derived according to the sub-block motion compensation coding tool for motion compensation. The Inter Prediction 1012 determines a predictor for each sub-block according to the corresponding sub-block MV Each sub-block MV is limited by the threshold according to some embodiments. The predictor for each sub-block is limited to be within the primary reference block according to some other embodiments. Either Intra Prediction 1010 or Inter Prediction 1012 supplies the selected predictor to Adder 1016 to form prediction errors, also called prediction residual. The prediction residual of the current block are further processed by Transformation (T) 1018 followed by Quantization (Q) 1020. The transformed and quantized residual signal is then encoded by Entropy Encoder 1032 to form a video bitstream. The video bitstream is then packed with side information. The transformed and quantized residual signal of the current block is then processed by Inverse Quantization (IQ) 1022 and Inverse Transformation (IT) 1024 to recover the prediction residual. As shown in FIG. 10, the prediction residual is recovered by adding back to the selected predictor at Reconstruction (REC) 1026 to produce reconstructed video data. The reconstructed video data may be stored in Reference Picture Buffer (Ref Pict. Buffer) 1030 and used for prediction of other pictures. The reconstructed video data recovered from REC 1026 may be subject to various impairments due to encoding processing; consequently, In-loop Processing Filter 1028 is applied to the reconstructed video data before storing in the Reference Picture Buffer 1030 to further enhance picture quality.

Figure 11:
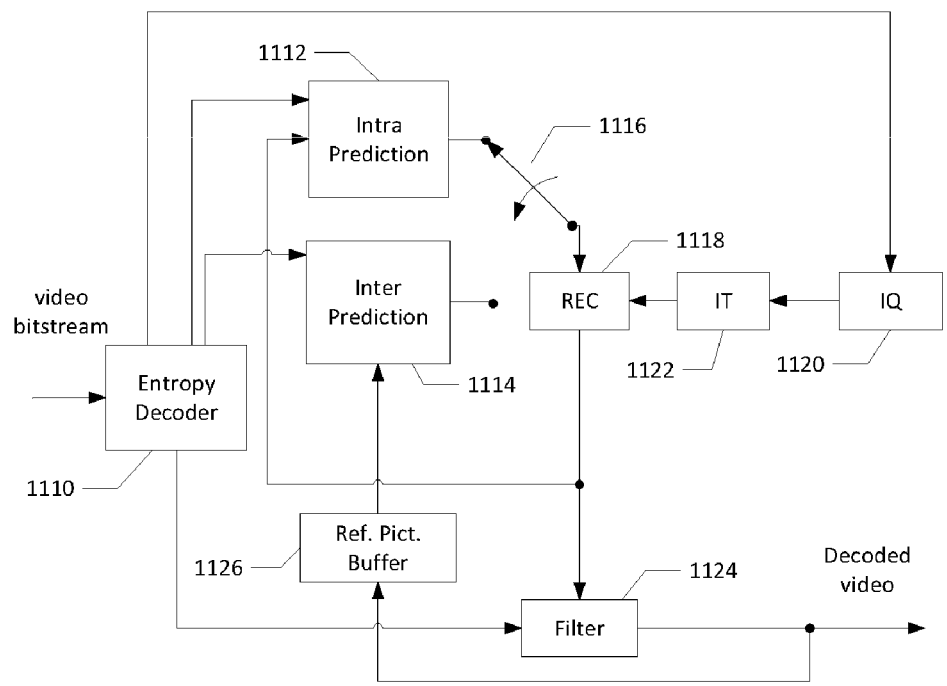
FIG. 11 illustrates an exemplary system block diagram for a video decoding system incorporating the video processing method according to embodiments of the present invention.

A corresponding Video Decoder 1100 for decoding the video bitstream generated from the Video Encoder 1000 of FIG. 10 is shown in FIG. 11. The video bitstream is the input to Video Decoder 1100 and is decoded by Entropy Decoder 1110 to parse and recover the transformed and quantized residual signal and other system information. The decoding process of Decoder 1100 is similar to the reconstruction loop at Encoder 1000, except Decoder 1100 only requires motion compensation prediction in Inter Prediction 1114. Each block is decoded by either Intra Prediction 1112 or Inter Prediction 1114. Switch 1116 selects an intra predictor from Intra Prediction 1112 or an inter predictor from Inter Prediction 1114 according to decoded mode information. Inter Prediction 1114 performs a sub-block motion compensation coding tool on a current block based on sub-block MVs. According to some embodiments, a threshold for restricting sub-block MVs, a sub-block size, or a size or shape of a primary reference block is adaptively determined by Inter Prediction 1114. According to another embodiment, Inter Prediction 1114 determines the threshold for restricting the sub-block MVs, the sub-block size, or the size or shape of the primary reference block for a block coded by the sub-block motion compensation coding tool by parsing the received video bitstream. The transformed and quantized residual signal associated with each block is recovered by Inverse Quantization (IQ) 1120 and Inverse Transformation (IT) 1122. The recovered residual signal is reconstructed by adding back the predictor in REC 1118 to produce reconstructed video. The reconstructed video is further processed by In-loop Processing Filter (Filter) 1124 to generate final decoded video. If the currently decoded picture is a reference picture for later pictures in decoding order, the reconstructed video of the currently decoded picture is also stored in Ref. Pict. Buffer 1126.

Various components of Video Encoder 1000 and Video Decoder 1100 in FIG. 10 and FIG. 11 may be implemented by hardware components, one or more processors configured to execute program instructions stored in a memory, or a combination of hardware and processor. For example, a processor executes program instructions to control receiving of input data associated with a current picture. The processor is equipped with a single or multiple processing cores. In some examples, the processor executes program instructions to perform functions in some components in Encoder 1000 and Decoder 1100, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIG. 10 and FIG. 11, Encoder 1000 and Decoder 1100 may be implemented in the same electronic device, so various functional components of Encoder 1000 and Decoder 1100 may be shared or reused if implemented in the same electronic device.

AMVR Adaptive Motion Vector difference Resolution (AMVR) supports three kinds of motion vector resolutions, including quarter-luma samples, integer-luma samples, and four-luma samples, to reduce side information of Motion Vector Differences (MVDs). Flags signaled in Sequence Parameter Set (SPS) level and CU level are used to indicate whether AMVR is enabled or not and which motion vector resolution is selected for a current CU. For a block coded in Advanced Motion Vector Prediction (AMVP) mode, one or two motion vectors are generated by uni-prediction or bi-prediction, and then one or a set of Motion Vector Predictors (MVPs) are also generated at the same time. A best MVP with the smallest Motion Vector Difference (MVD) compared to the corresponding MV is chosen for efficient coding. With AMVR enabled, MVs and MVPs are both adjusted according to the selected motion vector resolution, and MVDs will be aligned to the same resolution.

Conditional Extension of AMVR Larger resolutions of AMVR, such as eight-luma samples, sixteen-luma samples and so on, may be further tested with additional AMVR flag signaling in the video bitstream. The coding efficiency may be improved by allowing larger MVD resolutions. To further improve the coding efficiency, larger resolutions may be tested without signaling any additional AMVR flag. For example, an AMVR flag used to indicate the resolution of four-luma samples may represent a larger resolution such as eight-luma samples or sixteen-luma samples when a special condition is met. One embodiment of the special condition is when the Picture Order Count (POC) difference between a current frame and a reference frame is larger than a threshold. In this embodiment, if AMVR is enabled and inferred as a first resolution, such as four-luma samples, the resolution for MVD changes to a second resolution, such as eight-luma samples when the POC difference between the current frame and reference frame is larger than the preset threshold. The following AMVP process for generating MVs and MVPs will be calculated with eight-luma samples resolution. Furthermore, MVDs will be aligned to the resolution at the same time. The threshold here can be explicitly signaled or implicitly pre-defined. The threshold can be signaled in sequence level, picture level, slice level, CTU level, or CU level, or block level.

Another embodiment of the special condition is associated with the temporal layer of the current slice. In one example, for a current slice with AMVR enabled and the MVD resolution is inferred as four-luma samples, if the current slice is on a temporal layer smaller than a threshold (e.g. 1 or 2), which means the available reference frames in this slice is far away from each other in a time line, the AMVR flag originally indicating four-luma samples will now indicate as eight-luma samples. The following AMVP process for generating MVs and MVPs will be calculated with eight-luma samples resolution instead of four-luma samples. The threshold can be a signaled value or a pre-defined value, and the signaled value can be defined in sequence level, picture level, slice level, CTU level, CU level, or block level.

Combination of AMVR Flag and MVP Index AMVP mode uses one MVP index for selecting a MVP among those in a MVP candidate list according to the HEVC standard. If AMVR is enabled, both AMVR flag and MVP index need to be signaled. In some embodiments, multiple resolutions may be further tested without signaling an additional AMVR flag in order to further improve the coding efficiency. In one embodiment, MVPs with different MVP index can be generated as different resolutions under the same AMVR flag, whereas the generation of MVs is unchanged. MVs are generated with a precision based on AMVR flag. An embodiment is shown in Table 1 and Table 2 with different resolutions for MVs, MVPs and MVDs. Table 1 shows different motion vector resolutions for MVs and MVDs while Table 2 shows different motion vector resolutions for MVPs. For example, two MVPs with MVP index 0 and MVP index 1 are generated in AMVP mode. If AMVR is enabled and inferred as quarter-luma samples, the MVP with MVP index 0 will be generated as quarter-luma samples and the MVP with MVP index 1 will be generated as half-luma samples. These two MVP candidates can be generated in the same process or in different processes, respectively. The corresponding MV is generated as quarter-luma samples based on the AMVR flag. Different resolutions can be applied regarding to MVD calculation since MV and MVP resolutions are not aligned. In one example, MVPs with different indices are generated as different resolutions under the same AMVR flag and MVDs are rounded to the corresponding resolution the same as the MVP precision. In another example, MVPs with different indices are generated by different resolutions under the same AMVR flag and MVDs will be rounded to the corresponding resolution the same as the MV precision based on the AMVR flag.

TABLE 1

| AMVR Flag | MVP Index | |
|---|---|---|
| | 0 | 1 |
| 0 | Quarter-luma sample | Quarter-luma sample |
| 1 | Integer-luma sample | Integer-luma sample |
| 2 | Four-luma sample | Four-luma sample |

TABLE 2

| AMVR Flag | MVP Index | |
|---|---|---|
| | 0 | 1 |
| 0 | Quarter-luma sample | Half-luma sample |
| 1 | Integer-luma sample | Two-luma sample |
| 2 | Four-luma sample | Eight-luma sample |

In another embodiment, MVPs and MVs are generated with a precision based on the AMVR flag. Corresponding MVDs can be indicated to different resolutions based on different MVP indices. An example is shown in Table 3 and Table 4 with different resolutions for MVs, MVPs and MVDs. Table 3 shows different motion vector resolutions for MVs and MVPs, while Table 4 shows different motion vector resolutions for MVDs. For example, MVs and two MVPs with MVP index 0 and MVP index 1 are generated in AMVP mode with quarter-luma samples if AMVR is enabled and inferred as quarter-luma samples. The corresponding MVDs will be indicated as quarter-luma samples if the MVP with index 0 is chosen as the best MVP. Otherwise, the corresponding MVDs will be indicated as half-luma samples if the MVP with index 1 is chosen as the best MVP.

TABLE 3

| AMVR Flag | MVP Index | |
|---|---|---|
| | 0 | 1 |
| 0 | Quarter-luma sample | Quarter-luma sample |
| 1 | Integer-luma sample | Integer-luma sample |
| 2 | Four-luma sample | Four-luma sample |

TABLE 4

| AMVR Flag | MVP Index | |
|---|---|---|
| | 0 | 1 |
| 0 | Quarter-luma sample | Half-luma sample |
| 1 | Integer-luma sample | Two-luma sample |
| 2 | Four-luma sample | Eight-luma sample |

Adaptive Syntax Design for AMVR Table 5 shows a binarization of different motion vector resolutions in the traditional AMVR syntax design. In some embodiments, the MV resolution is adaptively signaled based on some conditions. Different binarization tables are applied to CUs with different sizes for multiple MV resolution coding according to one embodiment. For example, if a CU size is smaller than a threshold, 1 bin is used for integer-luma sample, and 2 bins are used for the remaining resolutions; otherwise, 1 bin is used for quarter-luma sample while 2 bins are used for the remaining resolutions. The threshold here can be explicitly signaled or implicitly pre-defined, and a threshold may be signaled in sequence level, picture level, slice level, CTU level, CU level, or block level. The coding binarization for different motion vector resolutions is shown in Table 6.

TABLE 5

| MV resolution | Binarization |
|---|---|
| Quarter-luma sample | 0 |
| Integer-luma sample | 10 |
| Four-luma sample | 11 |

TABLE 6

| MV resolution | Binarization |
|---|---|
| Integer pel | 0 |
| Quarter pel | 10 |
| 4 pel | 11 |

Embodiments of the video processing method for encoding or decoding may be implemented in a circuit integrated into a video compression chip or program codes integrated into video compression software to perform the processing described above. For examples, determining of a candidate set including an average candidate for coding a current block may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video processing method for sub-block motion compensation in a video coding system, the method comprising:
receiving input video data associated with a current block in a current picture to be encoded or decoded;
deriving a set of motion vectors (MVs) for a set of sub-blocks of the current block;
checking whether a same MV clipping process is applied to the set of sub-blocks of the current block according to a normalized primary reference block, wherein when a block size of the normalized primary reference block is larger than a predefined value, a result of checking the validity of applying a same MV clipping process is false;
encoding or decoding the current block according to a result of the checking indicating whether the same MV clipping process is applied or not;
wherein the same MV clipping process is applied to each sub-block of the set of sub-blocks in the current block when the checking result is false, otherwise sub-block motion compensation coding is applied to each sub-block of the set of sub-blocks in the current block;

wherein the MV clipping process includes setting all the sub-block MVs equal to a primary MV, and wherein the normalized primary reference block size is determined or restricted according to one or more control point MVs of the current block, wherein a first predefined value is used for the block size of the normalized primary reference block as the predefined value when the one or more control point MVs of the current block is bi-prediction and a second predefined value is used for the block size of the normalized primary reference block as the predefined value when the one or more control point MVs of the current block is uni-prediction, and the first predefined value is less than the second predefined value.

2. The method of claim 1, wherein the sub-block motion compensation coding is selected from a group comprising subblock Temporal Motion Vector Prediction (subblock TMVP), Spatial-Temporal Motion Vector Prediction (STMVP), affine motion compensation prediction, and sub-block refined Pattern-based Motion Vector Derivation (PMVD) mode.

3. A video processing method for sub-block motion compensation in a video coding system, comprising:

receiving input video data associated with a current block in a current picture;

adaptively determining a sub-block size for partitioning the current block, wherein the sub-block size for partitioning the current block coded by affine motion compensation prediction and a sub-block size for partitioning another block coded by affine motion compensation prediction are different;

partitioning the current block into multiple sub-blocks according to the sub-block size;

deriving sub-block Motion Vectors (MVs) associated with the sub-blocks in the current block according to the affine motion compensation prediction; and applying motion compensation to the current block using the sub-block MVs to encode or decode the current block, wherein the sub-block size is determined or restricted according to one or more control point MVs of the current block, wherein a first sub-block size is used if the one or more control point MVs of the current block is bi-prediction or multi-hypothesis prediction and a second sub-block size is used if the one or more control point MVs of the current block is uni-prediction, and the first sub-block size is larger than the second sub-block size.

4. The method of claim 3, wherein the sub-block size is restricted to be larger than or equal to a minimum sub-block size, and a first minimum sub-block size for bi-predicted or multi-hypothesis predicted sub-blocks is set to be larger than a second minimum sub-block size for uni-predicted sub-blocks.

5. The method of claim 3, wherein the sub-block size is determined or restricted according to a distance between the current picture and a reference picture of the current block.

6. The method of claim 3, wherein the sub-block size is determined or restricted according to a size, width, or height of the current block, a size, area, shape, width, or height of sub-blocks partitioned from the current block, an inter prediction direction of a sub-block MV, a control point MV, or a current MV, control point MVs, affine parameters, or a combination thereof.

7. The method of claim 3, further comprising signaling information related to the sub-block size for partitioning the current block in a video bitstream by a video encoder.

* * * * *